United States Patent [19]

Meyers

[11] 4,098,398

[45] Jul. 4, 1978

[54] CONTAINER FOR RECYCLE OF MOTOR OIL

[75] Inventor: Gene P. Meyers, Conroe, Tex.

[73] Assignee: Exxon Research & Engineering Co., Linden, N.J.

[21] Appl. No.: 794,908

[22] Filed: May 9, 1977

[51] Int. Cl.² ............... B65D 81/36; F16N 33/00
[52] U.S. Cl. .................. 206/223; 141/340; 184/1.5; 220/404
[58] Field of Search ............ 206/223, 169, 171, 216, 206/229; 229/15, 14 B, 14 BE; 184/1.5; 141/340, 337, 336

[56] References Cited

U.S. PATENT DOCUMENTS

| | | | |
|---|---|---|---|
| 2,050,636 | 8/1936 | Taub | 206/171 |
| 3,016,133 | 1/1962 | Jones | 206/169 |
| 3,090,526 | 5/1963 | Hamilton et al. | 229/14 B |
| 3,184,050 | 5/1965 | Dahberg et al. | 206/229 |
| 3,226,002 | 12/1965 | Walker | 229/14 BE |
| 3,703,956 | 11/1972 | Oswalt | 206/223 |
| 3,727,638 | 4/1973 | Zaremba, Jr. et al. | 184/1.5 |
| 3,967,697 | 7/1976 | Guenther | 184/1.5 |
| 3,974,911 | 8/1976 | Graser | 229/15 |
| 4,022,257 | 5/1977 | O'Connell | 141/340 |

*Primary Examiner*—William T. Dixson, Jr.
*Attorney, Agent, or Firm*—James E. Reed

[57] ABSTRACT

A packaging system for canned motor oil or the like comprises a paperboard box or similar semirigid package for holding one or more cans or other containers of liquid, an impervious bag of flexible sheet material having a mouth for the introduction of used liquid into the bag within the package and of sufficient size to substantially fill the package after the containers are removed, means for introducing used liquid into the bag within the box, and a cap for closing the bag after it has been filled.

20 Claims, 10 Drawing Figures

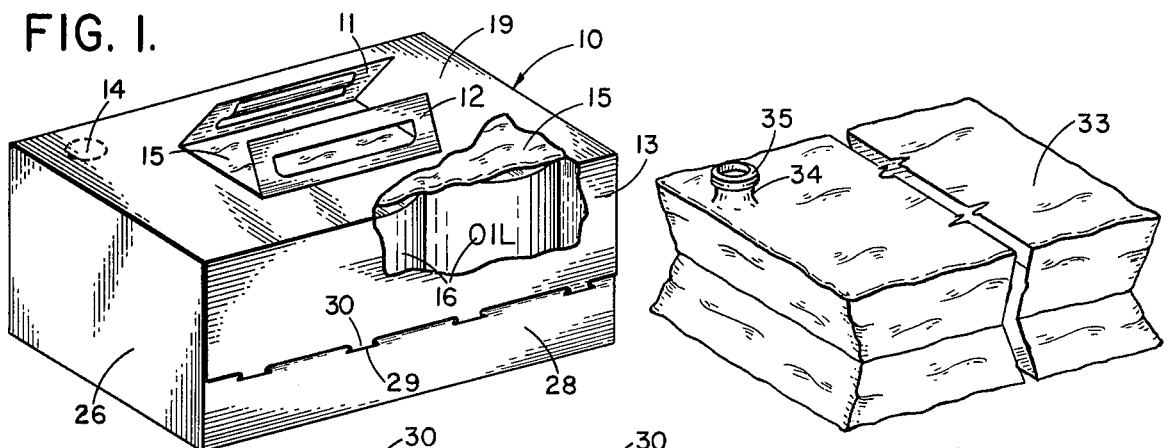
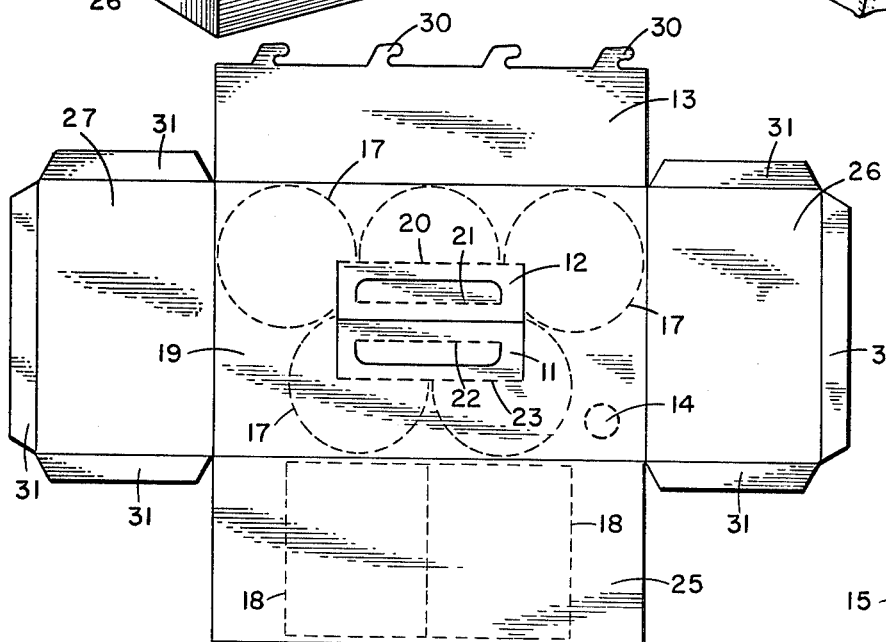
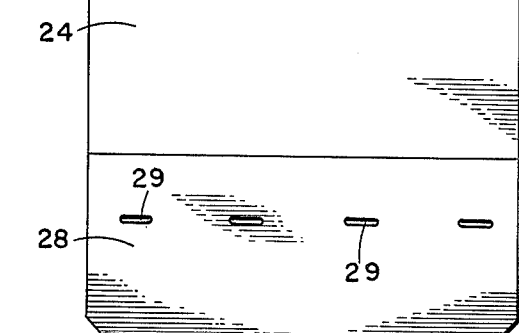
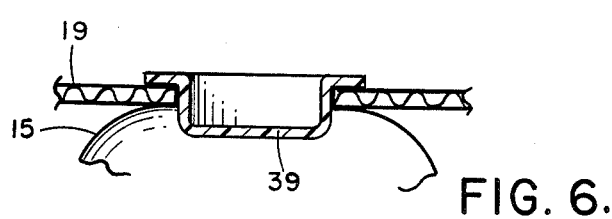

CONTAINER FOR RECYCLE OF MOTOR OIL

BACKGROUND OF THE INVENTION

1. Field of the Invention

This invention relates to packages for the marketing of motor oils and similar products and is particularly concerned with an improved packaging system which permits the collection and recycle of used products.

2. Description of the Prior Art

Motor oils, transmission fluids, engine coolants, and similar automotive fluids must be replaced at regular intervals. In the past, this has generally been done at service stations and garages but in recent years there has been a growing trend toward replacement by motorists themselves. One problem that arises in connection with such activities is that of disposing of the waste oil or other fluid. A recent survey showed that only about 16% of the approximately 120,000,000 gallons of waste oil generated each year as the result of "do-it-yourself" oil changes is returned to service stations or other collection points for recycling. Much of the rest of this used oil is discharged into sewer systems, poured into the ground, or disposed of in garbage collection systems, even though such disposal is prohibited by ordinance or statute in many areas. Serious pollution problems and fire hazards have on occasion arisen as the result of these practices.

Recognition of the "do-it-yourself" market has led to the development of oil change kits for sale at service stations and other outlets. The initial kits offered generally consisted of five 1-quart cans of motor oil packaged in a cardboard carrier but more recently some kits have included plastic bags into which the used oil can be poured and secured by means of wire ties. Such bags are difficult to handle and are easily ripped or torn. Pouring the used oil from such a bag into bulk storage is awkward at best. In many cases the wire ties do not prevent leakage or spilling of the oil. As a result of these and related problems, efforts to promote the use of plastic bags or similar low cost containers for the return of used oil to service stations or other suitable collection points have met with only limited success. Similar problems are encountered in the disposal of transmission fluids, engine coolants and the like.

SUMMARY OF THE INVENTION

This invention relates to an improved packaging system for the marketing of motor oils, transmission fluids, engine coolants, and similar liquids which must be changed or replaced periodically and cannot be discharged into sewer systems or the like. The improved system of the invention comprises a box or similar semirigid package of paperboard, cardboard, fiberboard, synthetic resin or the like for holding a containerized supply of oil or other liquid in cans, bottles, plastic bags or the like; a bag of flexible, impervious sheet material of sufficient size when filled with fluid to substantially fill the box or other package in the absence of the containerized supply of liquid and having an opening through which used liquid can be introduced into the bag within the box or other package; and a cap or similar closure for closing the bag after it has been filled with the used liquid. The outer box or package, after removal of the cans or other containers of oil or the like, supports the flexible bag within it as the bag is filled with used oil or other liquid and protects the filled bag against damage. The purchaser can thus use the box containing the bag for the collection, storage, and transportation of used oil or the like to a service station or other collection point without having to provide a separate receptacle or container and with relatively little chance for spillage or leakage of the liquid. In one embodiment of the invention, used motor oil or transmission fluid can be drained directly from an automobile or other vehicle into the supported bag without using a drain pan or the like. At the collection point, the used liquid can be transferred to bulk storage or, in some cases, simply stored by stacking the boxes containing the filled bags. The system of the invention simplifies the collection and recycling of used motor oil and other liquids, alleviates pollution problems and fire hazards often generated in connection with the disposal of such liquids, and has numerous other advantages.

BRIEF DESCRIPTION OF THE DRAWING

FIG. 1 in the drawing is a perspective view, partially cut away to show the contents, of one embodiment of the packaging system of the invention;

FIG. 2 is a plan view of a blank for the production of the outer box or package of the embodiment shown in FIG. 1;

FIG. 3 illustrates an internal plastic bag which may be employed for containing used oil in the embodiment of FIG. 1;

FIG. 4 shows an alternate type bag suitable for purposes of the invention;

FIG. 5 is an enlarged cross-sectional view of a portion of the embodiment of FIG. 1 following the insertion of the neck of the bag of FIG. 3 through an opening in the outer box or container;

FIG. 6 is an enlarged cross-sectional view illustrating an alternate to the arrangement of FIG. 4;

DESCRIPTION OF THE PREFERRED EMBODIMENTS

Figure 7:
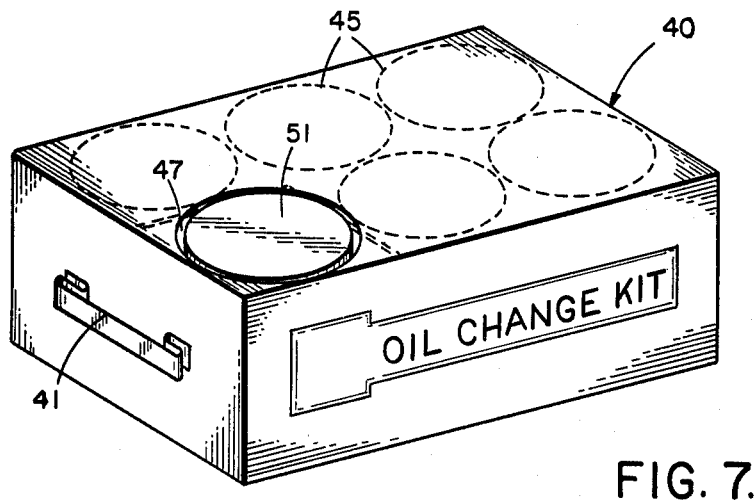
FIG. 7 is a perspective view of another embodiment of the invention.

The packaging system depicted in FIG. 1 comprises a semirigid outer box 10 of paperboard, cardboard, fiberboard, synthetic resin or similar material of sufficient size and suitable shape to contain a predetermined number of cans or other containers of motor oil, transmission fluid, engine coolant or other liquid without shifting or movement of the contents during transportation and handling of the box. The shape and dimensions of the box will depend in part upon the particular product to be marketed in the system, the type of containers in which that product is to be supplied, and the number of containers to be furnished. In the case of a packaging system for motor oils, for example, the box will normally be rectangular and of sufficient length, width, and height to hold five 1-quart cans of oil without movement or shifting of the cans. In some instances, it may be desirable to include space for an oil filter and gasket, a can opener, a pouring spout, or a funnel and to provide for a greater or lesser quantity of oil. The box is not restricted, of course, to the shape shown and may have any other desired configuration.

The box shown in FIG. 1 is provided with handles 11 and 12 which are formed by lifting and folding out portions of the top of the box and with a side 13 which can be opened to permit removal of the contents and later closed. The handles need not be located on the top of the box as shown and instead can be located on the side or end of the box if desired. Handles of cord or tape or simple "lift out" finger holes can also be provided. The box shown includes a lift-out disk 14 for insertion of the top of a plastic bag 15 which is included in the box. In the drawing, the empty bag is shown folded flat and placed on top of the oil cans, indicated by reference numeral 16, but other arrangements can be employed. The bag can be packed loosely into a space between the cans and the wall of the box, rolled into a small roll and secured by a rubber band or tie, or packed into a separate container enclosed in the box. A small funnel of plastic, heavy coated paper, or similar material or other items mentioned previously can also be included in such a space or separate container. The contents of the box will depend to some extent upon the type of automotive fluid or other liquid to be marketed in the packaging system and can be varied as necessary.

FIG. 2 in the drawing is a plan view of a blank for forming the box of FIG. 1. As indicated by the dotted lines designated by reference numerals 17 and 18, the dimensions of the blank are selected to permit the inclusion of 5 one-quart cans of oil. The portion of the blank 19 corresponding to the top of the box includes die-cut sections for forming handles 11 and 12 by punching out the cut portions and folding as indicated by dotted lines 20, 21, 22 and 23. The die-cut section for lift-out disk 14 is also located in the portion of the blank corresponding to the top of the box. The blank includes bottom section 24, side section 25, end sections 26 and 27, an inner side flap 28 containing slots 29, and an outer side flap 13 containing tabs 30 corresponding to the slots. The two end portions are provided with flaps 31 which are folded inwardly and glued, stapled, or otherwise secured to the bottom and side section 25 to hold the box together. In lieu of or in addition to using such flaps, the edges of the box formed by ends 26 and 27, side 25, and bottom 24 can be held together by tape or the like if desired. Tabs 30 fit into slots 29 to permit opening and closing of the side formed by flaps 28 and 13. It will be understood that the blank shown in FIG. 2 illustrates one arrangement of the box structure but that other arrangements involving the use of blanks of different design can be employed if desired.

One embodiment of the plastic bag included in the box of FIG. 1 is shown in an expanded state in FIG. 3 of the drawing. This bag 15 comprises a large elongated bag of polyethylene, polypropylene or similar thermoplastic material sufficiently large to completely fill the box as liquid is introduced into the bag following removal of the oil cans and any other items initially packed in the box. The upper end of this bag is gathered and attached to a ring of cardboard, synthetic resin or similar material 32 of slightly greater diameter than the opening in the top of the box formed by the removal of lift-out section 14. FIG. 4 depicts an alternate type of bag which can be used in lieu of that of FIG. 3. This bag 33 is of generally rectangular shape and has dimensions substantially conforming to the inside dimensions of the box. It includes a neck section 34 and is provided with a ring 35 similar to that of the bag of FIG. 3. Either bag can be folded flat so that it will fit into the box on top of the cans as shown in FIG. 1 or, alternatively, fitted into the space between the cans and the wall of the box below liftout section 14 in the top of the box. The material from which bag 15 or 33 is made will depend in part upon the particular liquid to be marketed in the package and should be selected to withstand any temperature and solvent effects that may be associated with use of the bag. In packages designed for use with motor oils, for example, a bag made of 1 ½ mil polyethylene may be satisfactory if it is to be used only with cool oil but a somewhat heavier bag of two mil or greater thickness and made of a resin having greater heat resistance than polyethylene may be preferred if hot oils is to be drained directly from an engine crankcase into the bag.

As can be seen from FIG. 5, the upper end of the bag of FIG. 3 is of sufficient length to extend through the opening in top section 19 formed by the removal of lift-out section 14. As indicated earlier, the film forming the bag may be glued, cemented or heat-sealed to a supporting ring 32 of polyethylene, nylon, cardboard or similar material which has a greater outside diameter than the inside diameter of the opening in the top of the box. The outer edges of this ring extend perpendicular to the upper surface of the box and hold a cap 36 in place. The cap shown is made of thermoplastic material and fits tightly against the outer circumference of the ring. In lieu of this arrangement, the outer portion of the ring and the inner surface of the cap can be provided with mating threads not shown in the drawing. The cap may be provided with a tab 38 to facilitate its removal. With a closure of the type shown in FIG. 5, the neck section may be inserted by depressing the ring sufficiently to permit its passage through the opening and then allowing it to return to its normal circular configuration on the outside of the box. Alternatively, the bag can be pushed downwardly through the opening from the outside until the ring is seated against the top of the box surrounding the opening. In either case, the ring holds the top of the bag in place and prevents it from being accidentally displaced downwardly into the box during filling and handling.

FIG. 6 in the drawing illustrates an alternate arrangement which can be employed in lieu of that shown in FIG. 5. In the system of FIG. 6, the top of the bag 15 surrounding the opening therein is cemented, glued or heat-sealed to the underside of the top 19 of the box about the opening formed by lift-out section 14. The closure shown is a hollow plug 39 of polyethylene, polypropylene or similar material which fits tightly into the opening and is held in place by friction. With the arrangement of FIG. 6, the bag is secured to the box before the cans and other articles are packed into the box; whereas with the arrangement of FIG. 5 the neck of the bag will normally be inserted into the opening after the cans and other items have been removed from the box. It will be understood that the arrangements shown in FIGS. 5 and 6 are merely exemplary and that any of a wide variety of other arrangements for attaching the bag to the box either before the box is initially packed or after its contents have been removed by the purchaser may be employed.

In utilizing an oil change kit embodying the packaging system of FIGS. 1 through 5, the purchaser of the kit will first open the box by removing the tabs 30 from slots 29 and opening flaps 28 and 13. The cans of oil, and the oil filter, gasket and funnel if these items are included, are then removed from the box. Handles 11 and 12 may be raised into position by lifting up the handle sections in the top of the box and folding them back along dotted lines 20 and 23. The cutout sections can then be folded in along lines 21 and 22 to form the handles. After this has been done, lift-out section 14 in the top of the box is removed and the bag is inserted in the opening by depressing ring 32 and sliding it through the opening or pushing the bag downwardly through the opening as described earlier. The bag can then be pulled downwardly into the lower portion of the box to expand it if necessary and the box can then be closed by returning flaps 28 and 13 to their original positions and inserting tabs 30 into slots 29. Once this has been done, the box containing the bag can be employed as a receptacle into which oil can be drained from the crankcase of an automobile or other vehicle, either by means of a funnel supplied with the kit or a funnel secured from other sources. As the used oil flows into the bag, the walls of the box surrounding the bag support it and protect it against puncture or rupture. Once the bag has been filled, the cap 36 can be fitted into place and the box containing the filled bag can be used to transport the oil to a suitable disposal point for recycle or other use. Because of the protection afforded to the bag by the box, the oil can be stored for extended periods within the box containing the bag. Alternatively, the oil can be transferred to bulk storage by simply removing the cap and pouring the oil from the bag into a larger storage container. In either case, the packaging system provides an efficient and low cost means for the collection, handling, transportation and at least temporary storage of used oil without the difficulties which have been encountered with systems proposed in the past.

Figure 8:
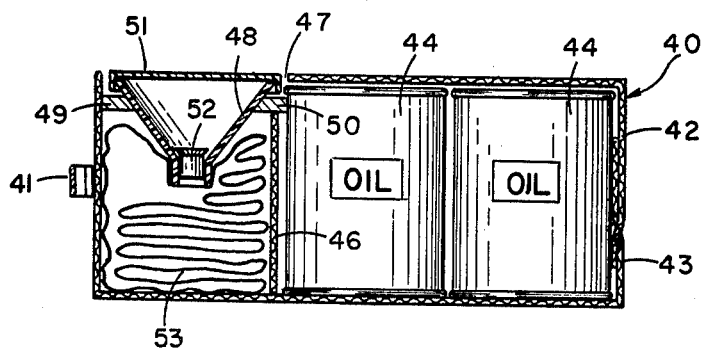
FIG. 8 is a cross-sectional view through the package of FIG. 7.

FIGS. 7 and 8 in the drawing illustrate another embodiment of the invention which differs from the earlier embodiment in that it includes a funnel attached to the bag in which the used oil or other fluid is collected. The packaging system shown in FIG. 7 includes an outer box 40 of cardboard or similar material provided with a handle 41 of laminated paper, fabric tape or the like on one end. If desired, the handle may be located elsewhere on the surface of the box and handles of other types may be used. The box shown includes flaps 42 and 43, shown in FIG. 8 of the drawing, by means of which the contents can be removed and the box reclosed after this has been done. The box of FIGS. 7 and 8 is designed to accommodate five 1-quart cans 44 of motor oil or the like. As indicated by the dotted lines 45 on the top of the box, these cans are arranged in one row of three and a second row containing only two cans. The space in the corner of the box at the end of the second row is set off by an L-shaped sheet of cardboard or the like 46 and the top of the box above this space contains a circular opening 47 having a diameter slightly greater than that of a 1-quart can of oil. A funnel 48 of coated cardboard, polyethylene or the like is positioned within this space and held in place by cardboard members 49 and 50 which are glued or otherwise attached to the walls and top of the box around opening 47. The funnel is in turn glued or otherwise attached to these members to secure it to the box. It is preferred that the outer diameter of the funnel be the same as that of a 1-quart can of oil and that the funnel be provided with a lid 51 of polyethylene or similar material. This lid will be kept in place on the funnel until the box is used by the purchaser. In the event that the purchaser desires to add oil to his vehicle instead of changing the oil and thus needs to open only a single can, the lid can be used to cover the can after part of the oil has been poured from it and thus prevent dust and other foreign matter from contaminating the oil. Lid 51 can also be used to cover the funnel after the bag in the box has been filled with used oil. The funnel contains a removable cork or similar plug 52 which also serves to prevent the loss of used oil. Bag 53 of polyethylene or similar material is bonded to the outer surface of the funnel below members 49 and 50 and is of sufficient size to completely fill the box after cardboard member 46 and the oil cans have been removed.

In using the oil change kit shown in FIGS. 7 and 8, the purchaser will first open the box by opening flaps 42 and 43 and remove the five 1-quart cans of oil. Cardboard separator 46 will also be removed. After this has been done, lid 51 is removed from the funnel and the cork 52 is taken out. The bag 53 can be pulled out toward the other end of the box if desired and the flaps are then closed. The box can now be employed to receive used motor oil, either directly from the crankcase of an engine or from a drain pan in which the oil has been collected. In either case, the used oil flows into the funnel and thence into the bag, filling the bag and forcing it outwardly against the walls of the box. After the bag has been substantially filled, cork 52 is replaced and lid 51 is snapped into place on top of the funnel. The box protects the bag of oil and prevents it from being torn or ruptured. It also facilitates movement of the bag with little or no danger of spilling the oil during handling and transportation. By removing the funnel lid 51 and cork 52, the oil can be transferred to bulk storage at a service station or other collection point without difficulty.

Figure 9:
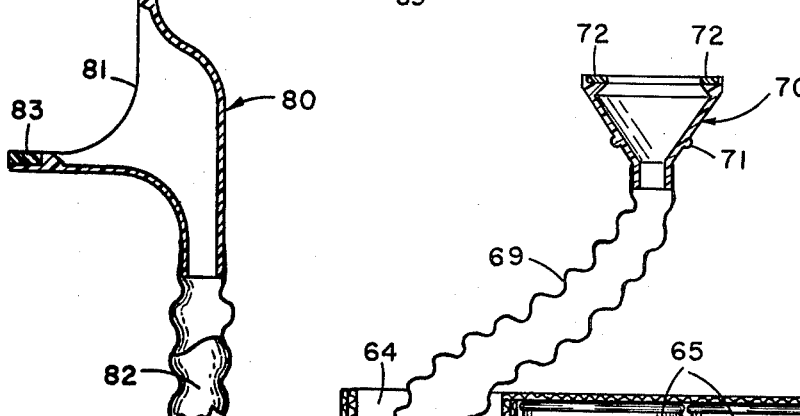
FIG. 9 is a cross-sectional view through still another embodiment of the invention.

FIG. 9 in the drawing shows in cross section still another embodiment of the invention which differs from that of FIGS. 7 and 8 in that it employs a removable funnel in lieu of a funnel permanently mounted in the box. The box 60 in the embodiment of FIG. 9 may be generally similar to that of the embodiment of FIGS. 7 and 8 and will include end flaps 61 and 62 for securing access to the interior of the box and a handle 63 which may be made of cardboard or the like and bonded to the outer surface of the box. The corner opening 64 in box 60 may be covered by a die-cut lift out section not shown in the drawing if desired. The arrangement of the oil cans 65 in box 60 is similar to that of the embodiment of FIGS. 7 and 8 and an L-shaped cardboard separator 66 similar to that in the earlier embodiment can also be employed. Located within the space below opening 64 is a supporting member 67 of cardboard or similar material which is glued or otherwise attached to the walls and top of the box. This supporting member may be in the form of a generally conical shaped member having a large opening at the bottom or may consist of a plurality of strips of cardboard or the like which extend inwardly toward the center of the space as shown.

Figure 10:
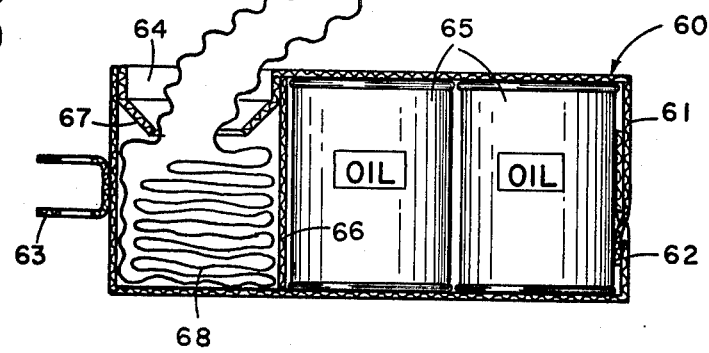
FIG. 10 is a cross-sectional view of an alternate type of funnel which can be employed for purposes of the invention.

Plastic bag 68 of sufficient size to fill the box after the oil cans and cardboard separator have been removed is located below supporting member 67 and includes an elongated neck or hose-like section 69 which is shown in FIG. 9 as extending upwardly through the supporting member. This section may be an integral part of the bag or may be a separately formed member to which the top of the bag is bonded. A funnel 70 is attached to the upper end of section 69. It is preferred that the funnel and the hose-like section connecting it to the lower part of the bag both have a relatively large diameter sufficient to permit the passage of used oil at a rate at least equivalent to that at which oil will normally drain from the crankcase of an automobile or other vehicle. Funnel 70 includes an outer lip 71 near its lower end. This lip engages the lower edge of supporting member 67 and serves to hold the funnel in place within the box. The funnel may be of essentially the same diameter as a 1-quart oil can to permit the use of a plastic lid similar to that of the kit of FIGS. 7 and 8 to cover the funnel and, if desired, also cover an opened can of oil. The funnel may be provided with two or more small magnets 72 for holding the funnel against the underside of an automobile or other vehicle so that oil can drain directly into the funnel. In lieu of metallic magnets as shown, pieces of commercially available magnetic polymeric material can be used for this purpose. The funnel is not restricted to the configuration shown in FIG. 9 and may instead have other configurations. In many automobiles, the oil drain plug is located on the side of the oil pan near the bottom. The configuration of the funnel 80 shown in FIG. 10 is such that the upper edge 81 of the funnel will fit closely against the oil pan surrounding the drain plug and permit the oil to flow into bag section 82. Magnets 83 may be provided in this funnel to hold it in place if desired.

The packaging system shown in FIG. 9 is used in much the same manner as that of FIGS. 7 and 8. After the oil cans and cardboard separator have been removed from the box, the bag may be pulled toward the end of the box before the flaps are closed. The funnel 70 can then be removed from supporting member 67 and hose-like section 69 pulled out to permit positioning of the funnel adjacent an oil drain plug. After the oil has been collected in bag 68 within the box, the funnel can be replaced by feeding section 69 downwardly through the supporting member and pushing the funnel downwardly until lip 70 engages the bottom of the supporting member. Thereafter, a cork or similar plug not shown in the drawing can be inserted in the neck of the funnel and a lid placed on top of the funnel. Once this has been done, the box containing the bag of oil can be transported to a suitable disposal point with little danger of ripping or tearing the bag or spilling the oil.

It will be understood that the system of the invention is not restricted to the particular configuration shown in the drawing and that numerous other arrangements can be employed. With some fluids, for example, it may be preferred to employ glass or plastic bottles or jars, plastic bags, or other packages in lieu of the cans shown. Similarly, the system is not restricted to the number of containers shown in the drawing and may employ a greater or a lesser number. The configuration of the box or other outer container is determined in part by the internal containers used and may be varied as necessary. These and other modifications of the system shown will be apparent to those skilled in the art.

I claim:

1. A packaging system for motor oil and similar liquids which comprises a semirigid outer package having inside dimensions sufficient to permit the inclusion therein of a containerized supply of liquid within said outer package; means for removing said containerized supply from said outer package; an empty bag of flexible, impervious material contained within said outer package and of sufficient size, on the introduction of used liquid into said bag following the removal of said containerized supply of liquid, to substantially fill said outer package; means for introducing used liquid into said bag while the bag is in said outer package; and means for preventing the escape of used liquid from said bag.

2. A packaging system as defined by claim 1 wherein said outer package comprises a box having inside dimensions selected to permit the inclusion therein of a plurality of 1-quart cans and said means for removing said containerized supply of liquid comprises a flap on said box.

3. A packaging system as defined by claim 1 wherein said bag is affixed to an inner surface of said package about an opening in the bag and said means for introducing used liquid into said bag comprises a removable section in said package covering said opening.

4. A packaging system as defined by claim 1 wherein said means for introducing used liquid into said bag comprises a removable section in said package for forming an opening in the outer surface of the package and means for securing the mouth of said bag within said opening.

5. A packaging system as defined by claim 4 wherein said means for securing said bag comprises a ring surrounding the mouth of the bag.

6. A packaging system as defined by claim 1 wherein said means for introducing used fluid into said bag comprises a funnel to which the mouth of said bag is attached and means for supporting said funnel in an opening in the outer surface of said package.

7. A packaging system as defined by claim 6 wherein said funnel is mounted in fixed position in said opening in said package.

8. A packaging system as defined by claim 6 wherein said funnel is removable from said opening and said bag includes an elongated hose-like section attached to said funnel.

9. A packaging system as defined by claim 6 wherein said funnel includes a magnetic member for holding said funnel in place against a ferrometallic body.

10. A packaging system as defined by claim 9 wherein said magnetic member comprises a magnetic polymeric member.

11. A packaging system for automotive fluids comprising a semirigid outer box provided with a flap which can be opened in one face of said box to permit the removal of a plurality of cans of fresh automotive fluid, said box having dimensions selected to prevent the shifting of said cans within said body; an empty, flexible, impervious bag disposed within said box and of sufficient size, on the introduction of used fluid into said bag following the removal of said cans, to substantially fill said box; means for introducing used fluid into said bag while the bag is within said box; and means for preventing the escape of used fluid from said bag.

12. A packaging system as defined by claim 11 wherein said means for introducing used fluid into said bag comprises an opening in the surface of said box in which the upper end of said bag may be positioned and a ring about said upper end to secure said bag in place.

13. A packaging system as defined by claim 11 wherein said means for introducing used fluid into said bag comprises a funnel positioned in an opening in the surface of said box and communicating with the interior of said bag.

14. A packaging system as defined by claim 13 wherein said means for preventing the escape of said used fluid comprises a stopper in the neck of said funnel.

15. A packaging system as defined by claim 11 wherein said means for introducing used fluid into said bag comprises an opening in the surface of said box and the mouth of said bag is bonded to said box about said opening.

16. A motor oil package comprising an outer box including means for opening and closing said box; a plurality of cans of motor oil within said box, said box and cans being sized to prevent the shifting of said cans within the box during transportation and handling; an empty plastic bag disposed within said box, said bag having a mouth and being of sufficient size, on the introduction of used oil into said bag while in said box following the removal of said cans, to substantially fill said box; means for introducing used oil into the mouth of said bag while the bag is within said box; and a closure for preventing the escape of used oil from the mouth of said bag.

17. A package as defined by claim 16 wherein said means for introducing said used oil comprises a removable section in the surface of said box for forming an opening within which said mouth of said bag can be secured.

18. A package as defined by claim 16 wherein said means for introducing said used oil comprises a removable closure over an opening in the surface of said box about which said mouth of said bag is bonded.

19. A package as defined by claim 16 wherein said means for introducing said used oil comprises a funnel mounted in fixed position within said box.

20. A package as defined by claim 16 wherein said means for introducing said used oil comprises a removable funnel and an elongated tubular member extending between said funnel and said mouth of said bag.

* * * * *